(12) United States Patent
Kasada

(10) Patent No.: US 9,984,710 B2
(45) Date of Patent: *May 29, 2018

(54) MAGNETIC TAPE HAVING CONTROLLED SURFACE PROPERTIES OF THE BACKCOAT AND MAGNETIC LAYER AND METHOD OF MANUFACTURING THE SAME

(71) Applicant: FUJIFILM Corporation, Tokyo (JP)

(72) Inventor: Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/378,907

(22) Filed: Dec. 14, 2016

(65) Prior Publication Data

US 2017/0178675 A1 Jun. 22, 2017

(30) Foreign Application Priority Data

Dec. 16, 2015 (JP) .................................. 2015-245144

(51) Int. Cl.
*G11B 5/68* (2006.01)
*G11B 5/78* (2006.01)
*G11B 5/84* (2006.01)

(52) U.S. Cl.
CPC .................. *G11B 5/68* (2013.01); *G11B 5/78* (2013.01); *G11B 5/84* (2013.01)

(58) Field of Classification Search
None
See application file for complete search history.

(56) References Cited

U.S. PATENT DOCUMENTS

| 4,825,317 A * | 4/1989 | Rausch | G11B 15/58 |
| | | | 360/128 |
| 8,535,817 B2 * | 9/2013 | Imaoka | G11B 5/70 |
| | | | 428/844 |
| 2011/0052908 A1 | 3/2011 | Imaoka | |
| 2017/0053669 A1 * | 2/2017 | Kasada | G11B 5/78 |

(Continued)

FOREIGN PATENT DOCUMENTS

| JP | 63-249932 A | 10/1988 |
| JP | 64-60819 A | 3/1989 |

(Continued)

OTHER PUBLICATIONS

Derwent Abstract of JP 2002-367318 A. (Year: 2002).*

(Continued)

*Primary Examiner* — Kevin M Bernatz
(74) *Attorney, Agent, or Firm* — Sughrue Mion, PLLC

(57) ABSTRACT

The magnetic tape has a magnetic layer containing ferromagnetic powder and binder on the surface on one side of a nonmagnetic support and has a backcoat layer containing nonmagnetic powder and binder on the surface on the other side thereof, wherein the centerline average surface roughness Ra as measured on the surface on the magnetic layer side of the magnetic tape is less than or equal to 1.8 nm, the logarithmic decrement as determined by a pendulum viscoelasticity test on the surface on the magnetic layer side of the magnetic tape is less than or equal to 0.050, and the logarithmic decrement as determined by a pendulum viscoelasticity test on the surface on the backcoat layer side is less than or equal to 0.060.

10 Claims, 4 Drawing Sheets

(56) References Cited

U.S. PATENT DOCUMENTS

2017/0053670 A1* 2/2017 Oyanagi .................. G11B 5/70
2017/0053671 A1* 2/2017 Kasada .................... G11B 5/78
2017/0372727 A1* 12/2017 Kasada ............. G11B 5/00813
2017/0372737 A1* 12/2017 Oyanagi ............ G11B 5/00813
2018/0061447 A1* 3/2018 Kasada .................... G11B 5/78

FOREIGN PATENT DOCUMENTS

| JP | 2002367318 A | * 12/2002 |
| JP | 2010-049731 A | 3/2010 |
| JP | 2011-48878 A | 3/2011 |

OTHER PUBLICATIONS

Office Action dated Oct. 5, 2017 from the United States Patent and Trademark Office in copending U.S. Appl. No. 15/241,286.
Office Action dated Oct. 5, 2017 from the United States Patent and Trademark Office in copending U.S. Appl. No. 15/241,297.
Office Action dated Oct. 5, 2017 from the United States Patent and Trademark Office in copending U.S. Appl. No. 15/241,631.

* cited by examiner

MAGNETIC TAPE HAVING CONTROLLED SURFACE PROPERTIES OF THE BACKCOAT AND MAGNETIC LAYER AND METHOD OF MANUFACTURING THE SAME

CROSS-REFERENCE TO RELATED APPLICATIONS

This application claims priority under 35 U.S.C 119 to Japanese Patent Application No. 2015-245144 filed on Dec. 16, 2015. The above application is hereby expressly incorporated by reference, in its entirety.

BACKGROUND OF THE INVENTION

Field of the Invention

The present invention relates to a magnetic tape and a method of manufacturing the same.

Discussion of the Background

Magnetic recording media include tape-shaped media and disk-shaped media. Magnetic recording media in the form of tapes, that is, magnetic tapes, are primarily employed in storage applications such as data backup. Signals are normally recorded on and reproduced from magnetic tapes by running a magnetic tape in a drive and causing a magnetic head (referred to simply as a "head" hereinafter) to come into sliding contact with the surface of the magnetic layer side of the magnetic tape.

In the field of magnetic recording, there is constant demand for enhanced electromagnetic characteristics. In this regard, for example, as described in Japanese Unexamined Patent Publication (KOKAI) No. 2010-049731, which is expressly incorporated herein by reference in its entirety, a magnetic recording medium with good electromagnetic characteristics can be obtained by enhancing the surface smoothness of the magnetic layer (that is, the surface smoothness on the magnetic layer side of the magnetic tape) (for example, see Japanese Unexamined Patent Publication (KOKAI) No. 2010-049731, paragraphs 0020 and 0178).

SUMMARY OF THE INVENTION

Increasing the smoothness of the surface on the magnetic layer side of a magnetic tape is an effective way to narrow the gap (spacing) between the surface on the magnetic layer side of a magnetic tape and the head and enhance the electromagnetic characteristics.

Further, as described in Japanese Unexamined Patent Publication (KOKAI) No. 2010-049731, paragraph 0021, providing a backcoat layer on the opposite side of the nonmagnetic support from that on which the magnetic layer is present has also been widely practiced in recent years.

The data that are recorded on magnetic recording media such as magnetic tapes are referred to as hot data, warm data, and cold data based on frequency of access (reproduction frequency). The access frequency decreases in the order of hot data, warm data, and cold data. Cold data are normally data that are stored as recorded on a magnetic medium for an extended period of greater than or equal to 10 years (for example, several decades). A recording medium for recording and storing such cold data is referred to as an archive recording medium. With the increase by leaps and bounds in the amount of information and the digitization of various information in recent years, the quantity of cold data being recorded and stored on archive recording media has also increased, resulting in ever higher demand for archive recording media.

Accordingly, the present inventor examined the application of magnetic tapes to archive recording media. He found that in magnetic tapes in which a backcoat layer was present on the opposite side of the nonmagnetic support from the side on which the magnetic layer was present and in which the smoothness of the surface on the magnetic layer side had been heightened to enhance the electromagnetic characteristics, the reproduction output would end up dropping with repeated running following acceleration testing equivalent to long-term storage.

An aspect of the present invention provides for a magnetic tape in which a backcoat layer is present on the opposite side of a nonmagnetic support from that on which a magnetic layer is present, which can exhibit good electromagnetic characteristics, in which a drop in reproduction output with repeated running following long-term storage can be inhibited, and which is suitable as an archive recording medium.

An aspect of the present invention relates to the following magnetic tape:

a magnetic tape, which has a magnetic layer containing ferromagnetic powder and binder on the surface on one side of a nonmagnetic support and has a backcoat layer containing nonmagnetic powder and binder on the surface on the other side thereof, wherein:

the centerline average surface roughness Ra as measured on the surface on the magnetic layer side of the magnetic tape is less than or equal to 1.8 nm, the logarithmic decrement as determined by a pendulum viscoelasticity test on the surface on the magnetic layer side of the magnetic tape is less than or equal to 0.050, and the logarithmic decrement as determined by a pendulum viscoelasticity test on the surface on the backcoat layer side is less than or equal to 0.060.

The above magnetic tape can afford a good electromagnetic characteristics, and make it possible to inhibit a drop in reproduction output with repeated running following long-term storage corresponding to data storage on an archive recording medium. The present inventor has made the following presumptions in this regard.

In one embodiment, the logarithmic decrement as determined by a pendulum viscoelasticity test on the surface on the magnetic layer side of the magnetic tape is greater than or equal to 0.010 but less than or equal to 0.050.

In one embodiment, the above centerline average surface roughness Ra is greater than or equal to 1.2 nm but less than or equal to 1.8 nm.

In one embodiment, the logarithmic decrement as determined by a pendulum viscoelasticity test on the surface on the backcoat layer side of the magnetic tape is greater than or equal to 0.010 but less than or equal to 0.060.

In one embodiment, the above magnetic tape has a nonmagnetic layer containing nonmagnetic powder and binder between the magnetic layer and the nonmagnetic support.

A further aspect of the present invention relates to a method of manufacturing the above magnetic tape, including forming a magnetic layer and forming a backcoat layer, wherein the forming of a magnetic layer includes:

coating a magnetic layer-forming composition containing ferromagnetic powder, binder, a curing agent, and solvent on a nonmagnetic support, either directly or over another layer, to form a magnetic coating layer, drying the magnetic coating layer by a heat treatment, and curing the magnetic coating layer by subjecting the magnetic coating layer to a curing treatment, with cooling the magnetic coating layer after the coating but before the drying, and burnishing the surface of the magnetic coating layer after the drying but before the curing; and forming of a backcoat layer includes:

coating a backcoat layer-forming composition containing nonmagnetic powder, binder, a curing agent, and solvent on a surface of the nonmagnetic support to form a nonmagnetic coating layer, drying the nonmagnetic coating layer by a heat treatment, and curing the nonmagnetic coating layer by subjecting the nonmagnetic coating layer to a curing treatment, with cooling the nonmagnetic coating layer after the coating but before the drying, and burnishing the surface of the nonmagnetic coating layer after the drying but before the curing.

In one embodiment, the cooling in the forming of a magnetic layer is conducted by placing the magnetic coating layer in a cooling atmosphere ranging from −10° C. to 0° C.

In one embodiment, the solvent contained in the magnetic layer-forming composition contains ketone solvent.

In one embodiment, the cooling in the forming of a backcoat layer is conducted by placing the nonmagnetic coating layer in a cooling atmosphere ranging from −10° C. to 0° C.

In one embodiment, the solvent contained in the backcoat layer-forming composition contains ketone solvent.

In one embodiment, the curing agent contained in the magnetic layer-forming composition and the curing agent contained in the backcoat layer-forming composition are thermosetting compounds, and the curing in the forming of a magnetic layer and the curing in the forming of a backcoat layer are carried out by heat treatments.

In one embodiment, the thermosetting component is polyisocyanate.

An aspect of the present invention can provide a magnetic tape in which a backcoat layer is present on the opposite side of a nonmagnetic support from that on which a magnetic layer is present, which is capable of exhibiting good electromagnetic characteristics, in which a drop in reproduction output with repeated running following long-term storage is inhibited, and which is suitable as an archive recording medium.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
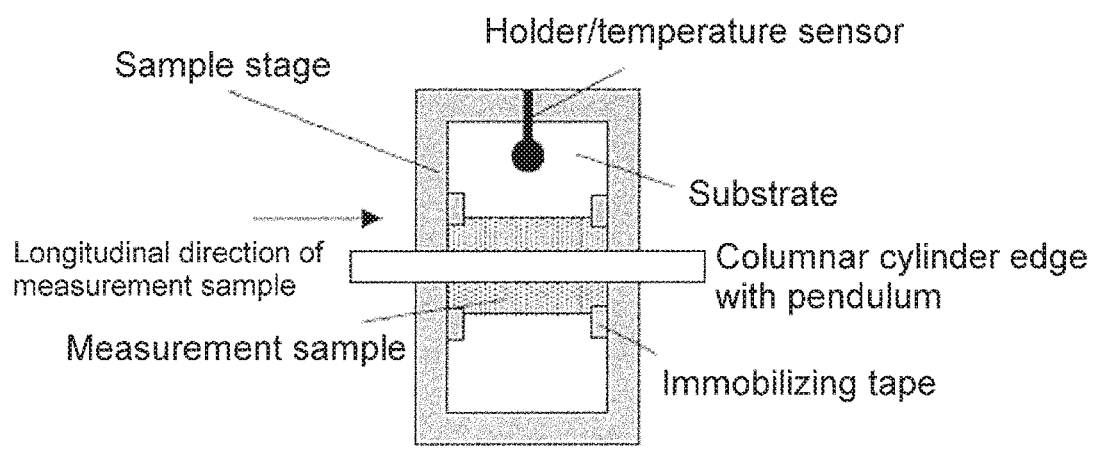
FIG. 1 is a descriptive drawing of the method of measuring the logarithmic decrement.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a magnetic tape, which has a magnetic layer containing ferromagnetic powder and binder on the surface on one side of a nonmagnetic support and has a backcoat layer containing nonmagnetic powder and binder on the surface on the other side thereof, wherein the centerline average surface roughness Ra as measured on the surface on the magnetic layer side of the magnetic tape is less than or equal to 1.8 nm, the logarithmic decrement as determined by a pendulum viscoelasticity test on the surface on the magnetic layer side of the magnetic tape (referred to as the "logarithmic decrement on the magnetic layer side", hereinafter) is less than or equal to 0.050, and the logarithmic decrement as determined by a pendulum viscoelasticity test on the surface on the backcoat layer side (referred to as the "logarithmic decrement on the backcoat layer side", hereinafter) is less than or equal to 0.060.

The above magnetic tape will be described in greater detail below.

[Centerline Average Surface Roughness Ra]

The centerline average surface roughness (magnetic tape surface roughness) Ra as measured on the surface on the magnetic layer side of the magnetic tape is less than or equal to 1.8 nm. This can allow the magnetic tape to exhibit good electromagnetic characteristics. From the perspective of further enhancing the electromagnetic characteristics, the centerline average surface roughness Ra is desirably less than or equal to 1.7 nm, preferably less than or equal to 1.6 nm, and more preferably, less than or equal to 1.5 nm. By way of example, the centerline average surface roughness Ra can be greater than or equal to 1.2 nm. However, from the perspective of enhancing the electromagnetic characteristics, the centerline average surface roughness Ra is desirably low, and can thus fall below this level.

The centerline average surface roughness Ra as measured on the surface on the magnetic layer side of the magnetic tape as referred to in the present invention and the present specification refers to the centerline average surface roughness Ra as measured in a region with an area of 40 μm×40 μm at any position on the surface on the magnetic layer side of the magnetic tape by an atomic force microscope (AFM). An example of an atomic force microscope that can be employed is the Nanoscope 4 made by Veeco. In Examples set forth further below, Nanoscope 4 made by Veeco was employed at a scan rate (probe displacement rate) of 40 μm/sec. and a resolution of 512 pixels×512 pixels to measure the centerline average surface roughness Ra.

The centerline average surface roughness Ra as measured on the surface on the magnetic layer side of the magnetic tape can be controlled by known methods. For example, the centerline average surface roughness Ra can be varied by means of the size of the various powders contained in the magnetic layer (such as the ferromagnetic powder and any nonmagnetic fillers optionally incorporated into the magnetic layer), the manufacturing conditions, and the like. Thus, a magnetic tape having a centerline average surface roughness Ra of less than or equal to 1.8 nm can be obtained by adjusting one or more of the above.

[Logarithmic Decrement]

<Logarithmic Decrement on the Magnetic Layer Side>

The logarithmic decrement (logarithmic decrement on the magnetic layer side) obtained by a pendulum viscoelasticity test on the surface on the magnetic layer side of the magnetic tape is less than or equal to 0.050. Thus, a magnetic tape having a centerline average surface roughness Ra within the range set forth above and a logarithmic decrement on the backcoat layer side of less than or equal to 0.060 makes it possible to inhibit a drop in reproduction output with repeated running following long-term storage corresponding to data storage on an archive recording medium. From the perspective of further inhibiting this drop in reproduction output, the logarithmic decrement on the magnetic layer side is desirably less than or equal to 0.045, preferably less than or equal to 0.040, more preferably less than or equal to 0.035, still more preferably less than or equal to 0.030, and even more preferably, less than or equal to 0.025. Additionally, the lower the logarithmic decrement on the magnetic layer side the better from the perspective of inhibiting this drop in reproduction output. Thus, no specific lower limit is set. By way of example, the logarithmic decrement is greater than or equal to 0.010, and can be greater than or equal to 0.015, or it can fall below these values. Specific ways to adjust the logarithmic decrement of the magnetic layer side will be described further below.

<Logarithmic Decrement on the Backcoat Layer Side>

The logarithmic decrement (logarithmic decrement on the backcoat layer side) obtained by a pendulum viscoelasticity test on the surface on the backcoat layer side of the magnetic tape is less than or equal to 0.060. Thus, a magnetic tape having a centerline average surface roughness Ra within the range set forth above and a logarithmic decrement on the backcoat layer side of less than or equal to 0.050 makes it possible to inhibit a drop in reproduction output with repeated running following long-term storage corresponding to data storage on an archive recording medium. From the perspective of further inhibiting this drop in reproduction output, the logarithmic decrement on the backcoat layer side is desirably less than or equal to 0.058, preferably less than or equal to 0.055, more preferably less than or equal to 0.054, still more preferably less than or equal to 0.050, and even more preferably, less than or equal to 0.045. Additionally, the lower the logarithmic decrement on the backcoat layer side the better from the perspective of inhibiting this drop in reproduction output. Thus, no specific lower limit can be set. By way of example, the logarithmic decrement can be greater than or equal to 0.010, greater than or equal to 0.015, greater than or equal to 0.020, or it can fall below these values. Specific ways to adjust the logarithmic decrement of the backcoat layer side will be described further below.

In the present invention and present specification, the logarithmic decrement on the magnetic layer side and the logarithmic decrement on the backcoat layer side are values determined by the following method.

Figure 2:
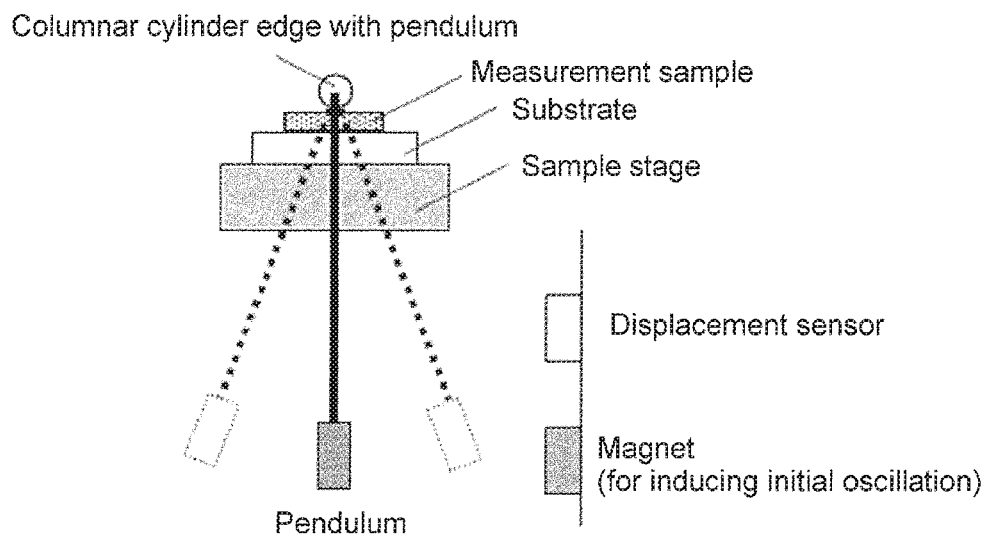
FIG. 2 is a descriptive drawing of the method of measuring the logarithmic decrement.
Figure 3:
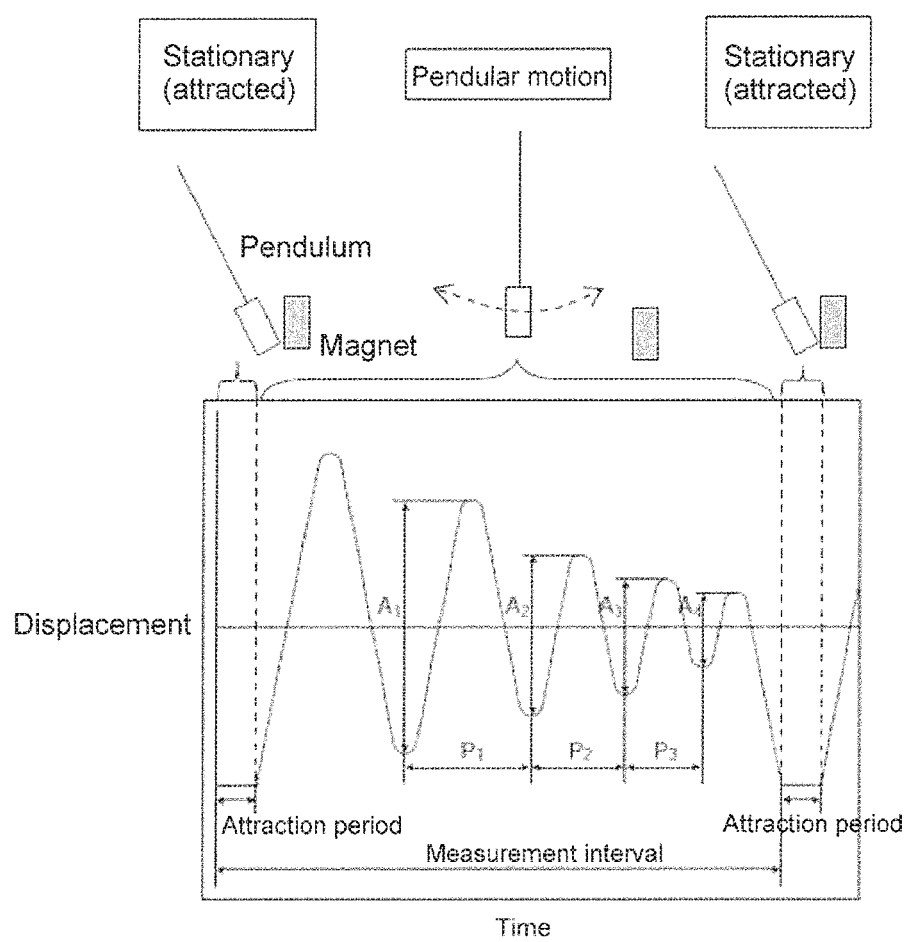
FIG. 3 is a descriptive drawing of the method of measuring the logarithmic decrement.

FIGS. 1 to 3 are descriptive drawings of the method of measuring the logarithmic decrement. The method of measuring the logarithmic decrement will be described below with reference to these figures. However, the forms shown in the figures are examples, and do not limit the present invention in any way.

A measurement sample is cut out of the magnetic tape to be measured. The measurement sample that has been cut out is placed with the measurement surface (surface on the magnetic layer side or on the backcoat layer side) facing upward on a substrate in a pendulum viscoelasticity tester, and is secured with immobilizing tape or the like in a state with no visibly apparent wrinkles.

The columnar cylinder edge (4 mm in diameter) equipped with a pendulum 13 g in weight is disposed on the measurement surface of the measurement sample such that the long axis direction of the columnar cylinder edge runs parallel to the longitudinal direction of the measurement sample. An example of the columnar cylinder edge equipped with a pendulum positioned (as viewed from above) on the measurement surface of a measurement sample in this manner is shown in FIG. 1. In the form shown in FIG. 1, a holder/temperature sensor is positioned in a configuration permitting monitoring of the substrate surface temperature. However, this configuration is not essential. The longitudinal direction of the measurement sample refers to the longitudinal direction of the magnetic tape out of which the measurement sample has been cut. The angles such as "parallel" that are referred to in the present specification may include the range of error that is permitted in the technical field to which the present invention belongs. For example, they mean falling within a range of less than ±10° of the precise angle. The error relative to the precise angle is desirably less than or equal to 5°, preferably less than or equal to 3°. The pendulum employed is made of a material having the property of being drawn by a magnet, such as a metal, alloy, or the like.

The surface temperature of the substrate on which the measurement sample has been positioned is raised at a rate of less than or equal to 5° C./min (any rate of increase less than or equal to 5° C./min will do) up to 80° C., and movement of the pendulum is begun (initial oscillation is induced) by removing the attraction between pendulum and magnet. FIG. 2 shows an example of how the pendulum moves (a lateral view). In the form shown in FIG. 2, within the pendulum viscoelasticity tester, the passage of electricity to the magnetic (electromagnet) positioned beneath the sample stage is halted (the switch is turned off) to remove the attraction, thereby causing the pendulum to begin to move. When electricity is restored to the electromagnetic (the switch is turned on), the pendulum is drawn by the magnetic, stopping movement of the pendulum. During movement of the pendulum, as shown in FIG. 2, the pendulum oscillates repeatedly. While the pendulum is oscillating repeatedly, the displacement of the pendulum is monitored by a displacement sensor. Based on the results obtained, a displacement-time curve is obtained by plotting the displacement on the Y-axis and time on the X-axis. FIG. 3 shows an example of a displacement-time curve. The correlation between the status of the pendulum and the displacement-time curve is schematically shown in FIG. 3. During a given measurement interval, stationary (attraction) and pendular motion are repeated. Using a displacement-time curve obtained for a measurement interval of greater than or equal to 10 minutes (any period greater than or equal to 10 minutes will do), the logarithmic decrement Δ (no unit) is obtained from the equation given below. The value obtained is adopted as the logarithmic decrement of the measured surface (surface on the magnetic layer side or on the backcoat layer side) of the magnetic tape. One attraction period is made greater than or equal to 1 second (any period greater than or equal to 1 second will do), and the period from the end of one attraction to the start of the next attraction is made greater than or equal to 6 seconds (any period greater than or equal to 6 seconds will do). The measurement interval refers to the interval from the start of one attraction to the start of the next attraction. The humidity of the environment in which pendular motion is conducted can be any relative humidity falling within a range of 40% to 70%.

$$\Delta = \frac{\ln\left(\frac{A_1}{A_2}\right) + \ln\left(\frac{A_2}{A_3}\right) + \cdots \ln\left(\frac{A_n}{A_{n+1}}\right)}{n}$$

In the displacement-time curve, the interval from one minimum displacement to the next minimum displacement is adopted as one wave period. The number of waves contained in the displacement-time curve during one measurement interval is denoted by n, and the difference between the minimum displacement and the maximum displacement of the $n^{th}$ wave is denoted by An. In FIG. 3, the interval from the minimum displacement of the $n^{th}$ wave to the next minimum is denoted as Pn (for example, $P_1$ for the 1st wave, $P_2$ for the second, $P_3$ for the third). The logarithmic decrement is calculated using the difference between the next minimum displacement and maximum displacement of the $n^{th}$ wave ($A_{n+1}$ in the above equation, $A_4$ in the displacement-time curve shown in FIG. 3). However, the portion during which the pendulum is stationary (attracted) following the maximum is not employed in counting the number of waves. Nor is the portion during which the pendulum is stationary (attracted) before the maximum displacement used to count the number of waves. Accordingly, in the displacement-time curve shown in FIG. 3, the number of waves is 3 (n=3). In the present invention and present specification, the logarithmic decrement is a value measured on a magnetic tape that is subjected neither to long-term storage corresponding to data storage on an archive recording medium nor acceleration testing equivalent to such long-term storage.

The present inventor presumes the following with regard to the logarithmic decrement on the magnetic layer side and the logarithmic decrement on the backcoat layer side. However, the following is mere conjecture, and is not intended to limit the present invention in anyway.

As set forth above, the electromagnetic characteristics can be enhanced by increasing the smoothness of the surface on the magnetic layer side of the magnetic tape. To that end, the centerline average surface roughness Ra measured on the surface on the magnetic layer side is specified as less than or equal to 1.8 nm. However, when the smoothness of the surface on the magnetic layer side is increased in this manner, the contact area between the surface on the magnetic layer side of the magnetic tape and the head during running (known as the actual contact area) is thought to increase. Thus, the present inventor presumes that components derived from the magnetic tape tend to adhere to the head from the surface on the magnetic layer side of the magnetic tape, and accumulate on the head with repeated running, resulting in spacing loss that causes a drop in reproduction output.

Accordingly, the present inventor conducted further extensive research into how to reduce the amount of component derived from the magnetic tape that adhered to and deposited on the head. As a result, he arrived at the notion that the above logarithmic decrements could serve as indicators of the quantity of component that adhered to and deposited on the head. The present inventor presumes that this component derived from the magnetic tape consists of adhesive components from the surface on the magnetic layer side of the magnetic tape that adhere to and accumulate on the head during running. Although details regarding such adhesive components are unclear, the present inventor presumes that these components are derived from the resin that is employed as binder. Details are as follows.

Various resins can be employed as binder in the manner described in detail further below. The term resin refers to polymer (including homopolymer and copolymer) of at least two polymerizable compounds, which usually contains a component with a molecular weight lower than the average molecular weight (referred to as a "low molecular weight binder component" below). The present inventor presumes that the fact that such a low molecular weight binder component adheres to the head from the surface on the magnetic layer side of the magnetic tape during running and accumulates with repeated running results in spacing loss that causes a drop in reproduction output. The low molecular weight binder component is presumed to be adhesive. The present inventor presumes that the logarithmic decrement determined by a pendulum viscoelasticity test is an indicator of the quantity of component that adheres to the head and deposits during running. In one embodiment, the magnetic layer is formed by coating, either directly or over another layer, a magnetic layer-forming composition containing a curing agent in addition to ferromagnetic powder and binder on a nonmagnetic support and subjecting it to a curing treatment. Here, the curing treatment can cause the binder and the curing agent to undergo a curing (crosslinking) reaction. However, the low molecular weight binder component, for an as yet undetermined reason, is presumed by the present inventor to react poorly in the curing reaction. Thus, the low molecular weight binder component tends not to remain in the magnetic layer, but tends to be released from the magnetic layer and adhere to the head. The present inventor presumes this to be one reason why the low molecular weight component tends to adhere to the head and accumulate during running.

Based on extensive research by the present inventor, it was revealed that just reducing the component derived from the magnetic layer is not enough to inhibit a drop in reproduction output with repeated running following long-term storage corresponding to the data storage of archive recording media. The present inventor presumes the following in this regard.

A magnetic tape is housed in a wound state on a reel in a magnetic tape cartridge. When recording a signal on the magnetic tape, the magnetic tape cartridge is loaded into a drive, the magnetic tape in the magnetic tape cartridge is caused to run, and the surface on the magnetic layer side of the magnetic tape contacts and slides across a magnetic head. The magnetic tape on which cold data have been recorded is wound up again on a reel after conducting the recording in this manner and is stored for an extended period—for example 10 years or more—housed in the magnetic tape cartridge. During long-term storage, the magnetic tape that is wound up on the reel is in a state where the surface of the magnetic layer side comes into contact with the surface of the backcoat layer side. The storage period is much longer than the period for which data are stored on a recording medium for ordinary data back-up purposes. When the magnetic tape is stored for long period in a wound up state with the surface on the magnetic layer side in contact with the surface on the backcoat layer side, and the magnetic tape is run within a drive following storage for an extended period, the contact between the surface on the magnetic layer side and the surface on the backcoat layer side is ended. The present inventor presumes that during the long-term storage, the adhesive component derived from the backcoat layer that is present on the surface on the backcoat layer side transfers to the surface on the magnetic layer side and remains on the surface on the magnetic layer side. The present inventor further presumes that the adhesive component derived from the backcoat layer is also derived from the resin employed as binder, as set forth above.

Given the above presumptions, the present inventor conducted further extensive research relating to inhibiting the drop in reproduction output with repeated running following long-term storage corresponding to the data storage of an archive recording medium of a magnetic tape having a backcoat layer and having a surface on the magnetic layer side with heightened smoothness. As a result, he arrived at keeping the logarithmic decrement on the magnetic layer side to less than or equal to 0.050 and keeping the logarithmic decrement on the backcoat layer side to less than or equal to 0.060, and discovered the magnetic tape according to one aspect of the present invention.

However, the present invention is not to be construed as being limited in any way by the presumptions of the present inventor set forth above.

[Magnetic Layer]

<Ferromagnetic Powder>

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present pecification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

<Binder, Curing Agent>

The above magnetic tape is a particulate magnetic tape. The magnetic layer contains ferromagnetic powder and binder. The various resins that are commonly employed as binders in particulate magnetic recording media can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the nonmagnetic layer and backcoat layer described further below. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 10,000 and less than or equal to 200,000 as a weight average molecular weight. The weight average molecular weight in the present invention and present specification is a value that is obtained by measurement by gel permeation chromatography (GPC) and converted to a polystyrene equivalent. Examples of measurement conditions are given below. The weight average molecular weights given in Examples further below are values obtained by measurement under the following measurement conditions and converted to polystyrene equivalents.

GPC device: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing coating strength, a curing agent can be added in a quantity of 50.0 to 80.0 weight parts for use.

<Additives>

As needed, one or more additives can be incorporated into a magnetic layer containing ferromagnetic powder and binder. An example of additives is the above curing agent. At least a portion of the curing agent can be contained into the magnetic layer in a state of having reacted (having crosslinked with) another component such as binder by causing a curing reaction to progress in the magnetic layer-forming process. Examples of additives that can be incorporated into the magnetic layer are nonmagnetic fillers, lubricants, dispersing agents, dispersion adjuvants, antifungal agents, antistatic agents, oxidation inhibitors, and carbon black. The additives can be used by suitably selecting commercial products based on the properties desired.

Nonmagnetic fillers, which are one form of additive, will be described below. However, the present invention is not limited to the embodiments given below.

(Nonmagnetic Filler)

One or more nonmagnetic fillers are desirably incorporated into the magnetic layer. In the present invention and the present specification, the term "nonmagnetic filler" is synonymous with the term "nonmagnetic powder," and means an aggregation of multiple nonmagnetic particles. The term "aggregation" is not limited to forms in which the constituent particles are in direct contact, but also includes forms in which binder, additives, or the like are present between the particles. The word "particles" is sometimes also used to denote powder. The same applies to the various powders in the present invention and described in the present specification. Examples of nonmagnetic fillers are nonmagnetic fillers that are capable of functioning as protrusion-forming agents that form protrusions that suitably protrude from the surface of the magnetic layer (referred to hereinafter as "protrusion-forming agents") and nonmagnetic fillers capable of functioning as abrasives (referred to hereinafter as "abrasives"). The protrusion-forming agents are components that can contribute to controlling the frictional characteristics of the surface of the magnetic layer. In the magnetic layer of the above magnetic tape, it is desirable for at least either a protrusion-forming agent or an abrasive to be incorporated, and preferable for both to be incorporated.

The protrusion-forming agent can be employed in the form of the various nonmagnetic fillers that are commonly employed as protrusion-forming agents. These can be inorganic or organic materials. In one embodiment, from the perspective of achieving uniform frictional characteristics, the particle size distribution of the protrusion-forming agents is desirably that of a monodispersion exhibiting a single peak, not that of a multidispersion exhibiting multiple distribution peaks. From the perspective of the availability of monodispersed particles, the nonmagnetic filler is desirably powder of an inorganic material. Examples of powders of inorganic materials are various powders such as metal oxides, metal carbonates, metal sulfates, metal nitrides, metal carbides, and metal sulfides. Powders of inorganic oxides are desirable. The protrusion-forming agent is preferably a colloidal particle, more preferably an inorganic oxide colloidal particle. From the perspective of the availability of monodispersed particles, the inorganic oxide constituting the inorganic oxide colloidal particle is desirably silicon dioxide (silica). The inorganic oxide colloidal particles are preferably colloidal silica (silica colloid particles). In the present invention and present specification, the term "colloidal particles" refers at least to particles capable of dispersing to form a colloidal dispersion without precipitating when added in a quantity of 1 g per 100 mL of an organic solvent in the form of at least one from among methyl ethyl ketone, cyclohexanone, toluene, ethyl acetate, or a mixed solvent of two or more of these solvents in any mixing ratio. The average particle size of colloidal particles is a value obtained by the method described as the average particle diameter measuring method in Japanese Unexamined Patent Publication (KOKAI) No. 2011-048878, paragraph 0015. In another embodiment, the protrusion-forming agent is desirably carbon black.

The average particle size of the protrusion-forming agent is, for example 30 nm to 300 nm, desirably 40 nm to 200 nm.

Examples of abrasives are those commonly employed as abrasives in the magnetic layer, such as powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond. Of these, alumina powders such as α-alumina and silicon carbide powders are desirable. The particle size of the abrasive, given as the specific surface area—an indicator of particle size—is, for example, greater than or equal to 14 $m^2/g$, desirably greater than or equal to 16 $m^2/g$, and more preferably, greater than or equal to 18 $m^2/g$. The specific surface area of the abrasive can be less than or equal to 40 $m^2/g$, for example. The specific surface area is a value determined by the nitrogen adsorption method (also known as the single-point Brunauer-Emmett-Teller (BET) method) by the measurement of primary particles. The specific surface area obtained by this method will also be referred to as the BET specific surface area.

From the perspective of achieving better development of the various functions of the protrusion-forming agent and abrasive, the content of the protrusion-forming agent in the magnetic layer is desirably 1.0 to 4.0 weight parts, preferably 1.5 to 3.5 weight parts, per 100.0 weight parts of ferromagnetic powder. The content of the abrasive in the magnetic layer is desirably 1.0 to 20.0 weight parts, preferably 3.0 to 15.0 weight parts, and more preferably, 4.0 to 10.0 weight parts, per 100.0 weight parts of ferromagnetic powder.

Examples of additives that can be employed in a magnetic layer containing abrasives are the dispersing agents for enhancing the dispersion of abrasives described in Japanese Unexamined Patent Publication (KOKAI) No. 2013-131285, paragraphs 0012 to 0022. The content of the above publication is expressly incorporated herein by reference in its entirety.

[Nonmagnetic Layer]

The nonmagnetic layer will be described next. In the above magnetic tape, a magnetic layer can be present directly on the nonmagnetic support, or a magnetic layer can be present over at least one other layer on the nonmagnetic support. This other layer is desirably a nonmagnetic layer containing nonmagnetic powder and binder. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

A backcoat layer is present on the surface of the nonmagnetic support on the opposite side from that on which the magnetic layer is present. The logarithmic decrement, as determined by a pendulum viscoelasticity test on the surface on the backcoat layer side of the magnetic tape (logarithmic decrement on the backcoat layer side) is less than or equal to 0.060. Details of the logarithmic decrement on the backcoat layer side are as described above. The backcoat layer contains nonmagnetic powder and binder, and can optionally contain known additives. Known techniques relating to backcoat layers can be applied regarding additional details such as the binder, additives, and the like of the backcoat layer. The backcoat layer can be formed by a curing step employing a backcoat layer-forming composition containing a curing agent. Those curing agents described above for use in the magnetic layer can be employed. The curing agent can be employed, for example, in a quantity of 0 to 80.0 weight parts, desirably 50.0 to 80.0 weight parts from the perspective of enhancing the coating strength, per 100.0 weight parts of binder in the backcoat layer-forming composition.

Reference can be made to the description of the nonmagnetic powder of the nonmagnetic layer set forth above with regard to the nonmagnetic powder of the backcoat layer. Examples of the nonmagnetic powder in the backcoat layer are either carbon black or a nonmagnetic inorganic powder other than carbon black, or both. Specific examples are nonmagnetic inorganic powders such as iron oxides such as α-oxide, titanium oxides such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. Desirable nonmagnetic inorganic powders are nonmagnetic inorganic oxide powders, preferably α-iron oxide and titanium oxide, and more preferably, α-iron oxide.

The nonmagnetic powder other than carbon black can be acicular, spherical, polyhedral, or tabular in shape. The average particle size of these nonmagnetic powders desirably falls within a range of 0.005 μm to 2.00 μm, preferably within a range of 0.01 μm to 0.20 μm. The BET specific surface area of the nonmagnetic powder desirably falls within a range of 1 $m^2$/g to 100 $m^2$/g, preferably 5 $m^2$/g to 70 $m^2$/g, and more preferably, within a range of 10 $m^2$/g to 65 $m^2$/g. The average particle size of the carbon black falls within a range of 5 nm to 80 nm, desirably 10 nm to 50 nm, and preferably, within a range of 10 nm to 40 nm. Reference can be made to the above description of nonmagnetic powder in the nonmagnetic layer with regard to the content (fill rate) of nonmagnetic powder in the backcoat layer. The content of carbon black falls, for example, within a range of 10.0 weight parts to 100.0 weight parts per 100.0 weight parts of the total quantity of nonmagnetic powder. The entire quantity of nonmagnetic powder can be in the form of carbon black. The entire quantity of nonmagnetic powder can also be in the form of a nonmagnetic powder other than carbon black.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of the Nonmagnetic Support, Thickness of the Various Layers]

The thickness of the nonmagnetic support and of the various layers in the above magnetic tape will be given below.

The thickness of the nonmagnetic support is desirably 3.00 μm to 4.50 μm.

The thickness of the magnetic layer can be optimized based on the saturation magnetization of the magnetic head employed, the length of the head gap, and the bandwidth of the recording signal, and it can be generally 10 nm to 150 nm. From the perspective of higher density recording, it is desirably 20 nm to 120 nm, preferably 30 nm to 100 nm. It suffices for at least one magnetic layer to be present. It is also possible to divide the magnetic layer into two or more layers with differing magnetic characteristics. Known configurations of multilayer magnetic layers can be applied.

The thickness of the nonmagnetic layer is, for example, 0.01 μm to 3.00 μm, desirably 0.05 μm to 2.00 μm, and more preferably, 0.05 μm to 1.50 μm.

The thickness of the backcoat layer is desirably less than or equal to 0.90 μm, preferably 0.10 μm to 0.70 μm.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Manufacturing Process]

<Preparation of the Various Layer-Forming Compositions>

The compositions for forming the magnetic layer, nonmagnetic layer, and backcoat layer normally contain solvent in addition to the various components that have been set forth above. Examples of the solvent are the various organic solvents generally employed in the manufacturing of particulate magnetic recording media. Specific examples of solvents that can be employed are, in any proportions, acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethylformamide; and hexanone. Of these, from the perspective of solubility of the binders commonly employed in particulate magnetic recording media, one or more ketone solvents are desirably incorporated into the magnetic layer-forming composition. The quantity of solvent in the magnetic layer-forming composition is not specifically limited. The quantity can be the usual quantity in the magnetic layer-forming composition of a particulate magnetic recording medium. The proportion (weight basis) of ketone solvent in the total quantity of the solvent contained in the magnetic layer-forming composition can be, for example, equal to or greater than 50 weight %, equal to or greater than 60 weight %, equal to or greater than 70 weight %, equal to or greater than 80 weight %, equal to or greater than 90 weight %, or can be 100 weight %.

The description given above also applies to the solvents employed in the various layer-forming compositions, such as the backcoat layer-forming composition and the like.

The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, binder, nonmagnetic powder, various optionally added additives, solvent, and the like that are employed in the present invention can be added at the start, or part way through, any of these steps. An individual starting material can be divided for addition in two or more steps. For example, it is possible to separately disperse the abrasive from the ferromagnetic powder in preparing the magnetic layer-forming composition. Separate dispersion is desirable. An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety. Glass beads or some other form of bead can be employed to disperse the compositions for forming the various layers. High-density dispersion beads in the form of zirconia beads, titania beads, and steel beads are suitable as such dispersion beads. The particle diameter (diameter of beads) and fill rate of these dispersion beads can be optimized for use. A known disperser can be employed.

<Coating Step, Cooling Step, Heating and Drying Step, Burnishing Step, Curing Step>

The above magnetic tape can be manufactured by the manufacturing method including at least a magnetic layer-forming process and a backcoat layer-forming process. IN the magnetic layer-forming process, the magnetic layer can be formed by directly coating the magnetic layer-forming composition on a nonmagnetic support, and is desirably formed by sequentially or simultaneously coating it with the nonmagnetic layer-forming composition. Reference can be made to Japanese Unexamined Patent Publication (KOKAI) No. 2010-231843, paragraph 0066, for details regarding coatings to form the various layers. The content of the above publication is expressly incorporated herein by reference in its entirety.

In one desirable embodiment, the above magnetic tape is manufactured by a manufacturing method including a magnetic layer-forming process, with the magnetic layer-forming process including:

a coating step of forming a magnetic coating layer by coating a magnetic layer-forming composition containing ferromagnetic powder, binder, a curing agent, and solvent on a nonmagnetic support, either directly or over another layer;

a heating and drying step of drying the magnetic coating layer by a heat treatment; and a curing step of subjecting the magnetic coating layer to a curing treatment;

with a cooling step of cooling the magnetic coating layer being incorporated between the coating step and the heating and drying step, and a burnishing step of burnishing the surface of the magnetic coating layer being incorporated between the heating and drying step and the curing step.

The present inventor presumes that implementing a cooling step and a burnishing step in the process of forming the magnetic layer in the above manufacturing method is a desirable way to keep the logarithmic decrement on the magnetic layer side to less than or equal to 0.050. Details are as follows. The present inventor presumes that conducting a cooling step to cool the coating layer between the coating step and the heating and drying step can contribute to causing the adhesive component that adheres to the head from the surface on the magnetic layer side of the magnetic tape during running to be present on the surface of the magnetic coating layer and/or in the surface layer portion. Although the reason for this is unclear, the present inventor presumes that cooling the magnetic coating layer of the magnetic layer-forming composition prior to the heating and drying step can facilitate the migration of the adhesive component to the surface and surface layer portion of the magnetic coating layer during solvent volatilization in the heating and drying step. The present inventor presumes that subjecting the surface of the magnetic coating layer in which the adhesive component is present on the surface and/or surface layer portion to a burnishing treatment can remove the adhesive component from the surface on the magnetic layer side. The present inventor presumes that conducting a curing step after removing the adhesive component in this manner can relate to keeping the logarithmic decrement on the magnetic layer side to less than or equal to 0.050. However, these are merely presumptions and are not intended to limit the present invention in any way.

In one desirable embodiment, the backcoat layer-forming process desirably include:

a coating step of forming a nonmagnetic coating layer by coating a backcoat layer-forming composition containing nonmagnetic powder, binder, a curing agent, and solvent on a nonmagnetic support;

a heating and drying step of drying the nonmagnetic coating layer by a heat treatment; and a curing step of subjecting the nonmagnetic coating layer to a curing treatment;

with a cooling step of cooling the nonmagnetic coating layer being incorporated between the coating step and the heating and drying step, and a burnishing step of burnishing the surface of the nonmagnetic coating layer being incorporated between the heating and drying step and the curing step.

The present inventor presumes that implementing a cooling step and burnishing step in the backcoat layer-forming process is a desirable way to keep the logarithmic decrement on the backcoat layer side to less than or equal to 0.060. The details are as set forth above for the magnetic layer-forming step. The present inventor presumes that subjecting the surface of the nonmagnetic coating layer in which the adhesive component is present on the surface of the nonmagnetic coating layer and/or in the surface layer portion to a burnishing treatment can remove the adhesive component from the surface on the backcoat layer side. The present inventor presumes that conducting a curing step after removing the adhesive component in this manner can relate to keeping the logarithmic decrement on the backcoat layer side to less than or equal to 0.060. However, these are merely presumptions and are not intended to limit the present invention in any way.

That is, an aspect of the present invention relates to a method of manufacturing a magnetic tape according to one aspect of the present invention, including the above magnetic layer-forming process and backcoat layer-forming process.

As set forth above, the magnetic layer-forming composition can be sequentially or simultaneously multilayer coated with the nonmagnetic layer-forming composition. In a desirable embodiment, the above magnetic tape can be manufactured by sequential multilayer coating. The manufacturing process by sequential multilayer coating is desirably conducted as follows. The nonmagnetic layer is formed by a coating step of forming a coating layer by coating a nonmagnetic layer-forming composition on a nonmagnetic support and a heating and drying step of drying by means of a heat treatment the coating layer that has been formed. A magnetic layer is then formed by a coating step of coating a magnetic layer-coating composition on the nonmagnetic layer that has been formed to form a coating layer and a heating and drying step of drying by means of a heat treatment the coating layer that has been formed.

A specific embodiment of the above manufacturing method will be described based on FIG. 4 below. However, the present invention is not limited by the specific embodiment given below.

Figure 4:
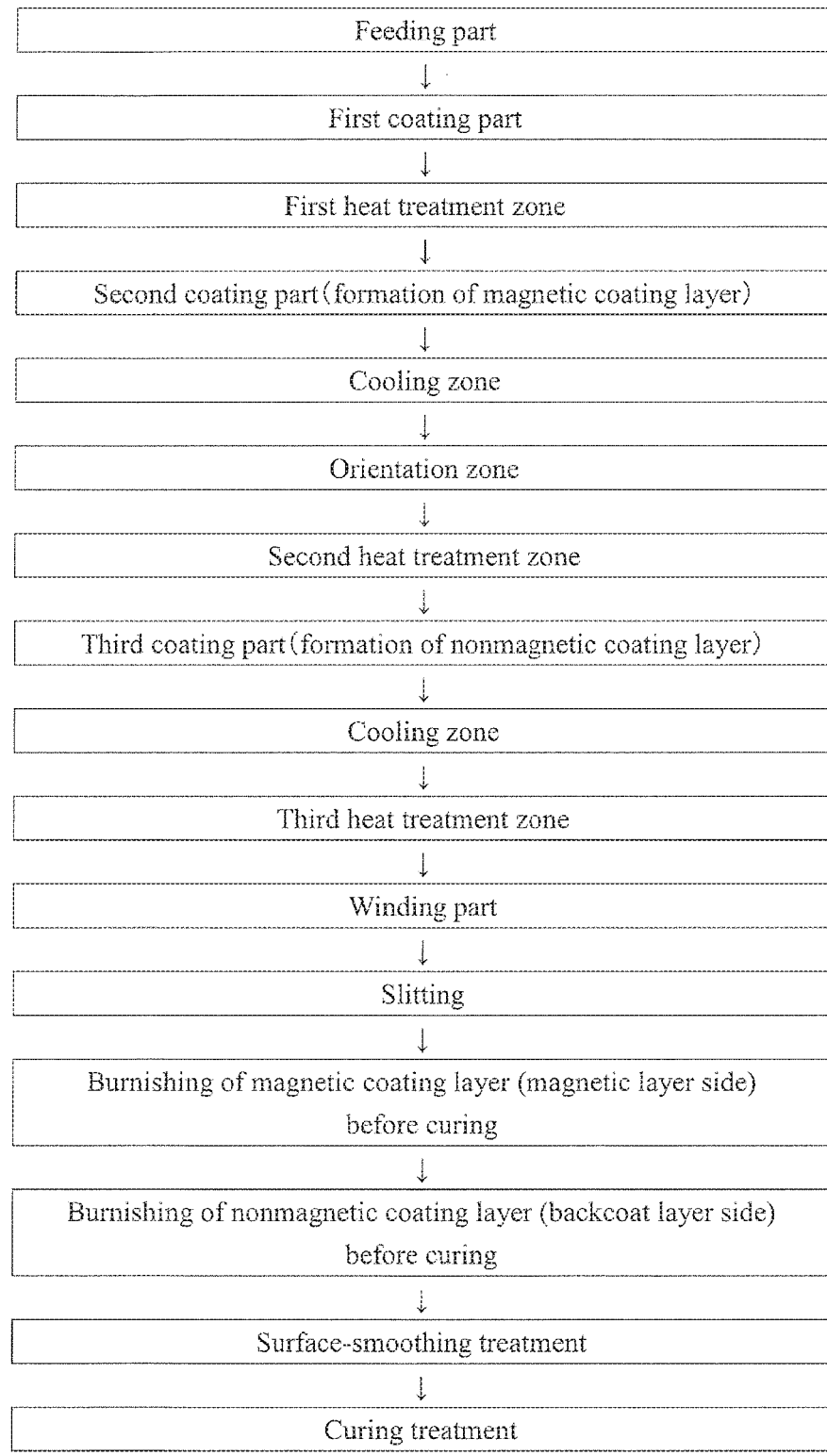
FIG. 4 is an example (process schematic) of a specific form of the magnetic tape manufacturing process.

FIG. 4 is a process schematic showing a specific embodiment of the process of manufacturing a magnetic tape having on one surface of a nonmagnetic support a nonmagnetic layer and a magnetic layer, in that order, and having a backcoat layer on the other surface thereof. In the embodiment shown in FIG. 4, the operations of feeding a nonmagnetic support (elongated film) from a feeding part and winding it up on a winding part are continuously conducted. By means of various processes such as coating, drying, and orienting that are conducted by the various parts and in the various zones shown in FIG. 4, a nonmagnetic layer and magnetic layer are formed by sequential multilayer coating on one surface of a running nonmagnetic support, and a backcoat layer is formed on the other surface thereof. With the exceptions that a cooling zone is incorporated into each of the magnetic layer-forming process and the backcoat layer-forming process as well as a burnishing step is incorporated before curing, the process can be conducted in the normal fashion for manufacturing particulate magnetic recording media. FIG. 4 shows an embodiment in which the backcoat layer-forming composition is coated after coating the nonmagnetic layer-forming composition and the magnetic layer-forming composition. However, it is also possible to coat the nonmagnetic layer-forming composition and magnetic layer-forming composition after coating the backcoat layer-forming composition.

The nonmagnetic layer-forming composition is coated in a first coating part on the nonmagnetic support that is fed by the feeding part (nonmagnetic layer-forming composition coating step).

Following the coating step, the coating layer of the nonmagnetic layer-forming composition that has been formed by the coating step is heated to dry it in a first heating zone (heating and drying step). The heating and drying can be conducted by causing the nonmagnetic support on which is present a coating layer of the nonmagnetic layer-forming composition through a hot atmosphere. The temperature of the hot atmosphere is, for example, 60° C. to 140° C.; a temperature capable of drying the coating layer by volatizing the solvent will suffice, and there is no limitation to within this range. It is also possible to optionally blow a heated gas onto the surface of the coating layer. The above can be applied for the heating and drying step in the second heating zone and the heating and drying step in the third heating zone, described further below.

Next, in the second coating part, the magnetic layer-forming composition is coated on the nonmagnetic layer that has been formed by the heating and drying step in the first heating zone (magnetic layer-forming composition coating step in which a magnetic coating layer is formed).

Following the above coating step, the coating layer (magnetic coating layer) of the magnetic layer-forming composition that has been formed by the coating step is cooled in a cooling zone (cooling step). For example, the cooling step can be conducted by passing the nonmagnetic support, on which the above coating layer has been formed over the nonmagnetic layer, through a cold atmosphere. The temperature of the cold atmosphere desirably falls within a range of −10° C. to 0° C., and preferably falls within a range of −5° C. to 0° C. The duration of the cooling step (for example, the period from when the some portion of the coating layer is conveyed into the cooling zone to when it is conveyed out (also referred to as the "residence period" hereinafter) is not specifically limited. The longer it is, the lower the value of the logarithmic decrement tends to be. It is desirable to respond to the requirement of achieving a logarithmic decrement on the magnetic layer side of less than or equal to 0.050, if necessary, by conducting preliminary tests and making adjustments. It is also possible to blow a cold gas onto the surface of the coating layer in the cooling step.

Subsequently, while the coating layer of the magnetic layer-forming composition is still wet, an orientation treatment is conducted on the ferromagnetic powder in the magnetic coating layer in the orientation zone. Reference can be made to Japanese Unexamined Patent Publication (KOKAI) No. 2010-231843, paragraph 0067, with regard to the orientation treatment.

Following the orientation treatment, the magnetic coating layer is subjected to a heating and drying step in a second heating zone.

Next, in a third coating part, a coating layer is formed by coating the backcoat layer-forming composition on the surface on the opposite side of the nonmagnetic support from the surface on which the nonmagnetic layer and magnetic layer have been formed (backcoat layer-forming composition coating step in which a nonmagnetic coating layer is formed).

Following the above coating step, the coating layer (nonmagnetic coating layer) of the backcoat layer-forming composition that has been formed by the coating step is cooled (cooling step) in a cooling zone. Details of the cooling step are as described for the cooling step for the coating layer (magnetic coating layer) of the magnetic layer-forming composition. In this cooling step, as well, the longer the duration of the cooling step, the lower the value of the logarithmic decrement tends to become. It is desirably adjusted by conducting preliminary testing as needed to achieve a logarithmic decrement in the backcoat layer side of less than or equal to 0.060.

Subsequently, following the cooling step, the nonmagnetic coating layer is subjected to a heat treatment and dried in a third heat treatment zone.

In this manner, it is possible to obtain a magnetic tape having a coating layer of a magnetic layer-forming composition that has been heated and dried on a nonmagnetic layer on one surface of a nonmagnetic support, and having a backcoat layer on the other surface thereof. The magnetic tape thus obtained is then subjected to the various post-processing set forth further below to obtain a magnetic tape product.

The magnetic tape that is obtained is wound up on a winding part and then cut (slit) to the size of a finished magnetic tape. The slitting can be conducted with a known cutting machine.

Before conducting a curing treatment (heating, irradiation with light, or the like) based on the type of curing agent contained in the magnetic layer-forming composition and backcoat layer-forming composition on the magnetic tape that has been slit, the surface of the coating layer (magnetic coating layer) of the magnetic layer-forming composition that has been heated and dried and the surface of the coating layer (nonmagnetic coating layer) of the backcoat layer-forming composition that has been heated and dried are subjected to a burnishing treatment (the burnishing treatment step between the heating and drying step and the curing step). The burnishing treatment of the magnetic coating layer and that of the nonmagnetic coating layer can be conducted in any order; that is, the former can be conducted first, or the latter can be conducted first. It is also possible to conduct the two burnishing treatments simultaneously. As an example, FIG. 4 shows an embodiment in which a burnishing treatment is conducted first on the magnetic coating layer and then on the nonmagnetic coating layer. The fact that the adhesive component that has migrated to the surface and/or the surface layer portion of the magnetic coating layer and nonmagnetic coating layer that have been cooled in cooling zones can be removed by the burnishing treatment is presumed by the present inventor to relate to controlling the logarithmic decrement on the magnetic layer side to less than or equal to 0.050 and the logarithmic decrement on the backcoat layer side to less than or equal to 0.060, respectively. However, as set forth above, this is merely a presumption, and is not intended to limit the present invention in any way.

The burnishing treatment is a treatment by which the surface being treated is rubbed by a member (such as a polishing tape or a grinding device such as a grinding blade or a grinding wheel), and can be conducted as burnishing treatments that are known in the manufacturing of particulate magnetic recording media. However, the burnishing treatment has not conventionally been conducted at a stage after the cooling step and heating and drying step but before the curing step. By contrast, conducting the burnishing treatment at this stage makes it possible to keep the logarithmic decrement on the magnetic layer side and that in the backcoat layer side to the above ranges. This point has been discovered by the present inventors.

The burnishing treatment is desirably implemented by either rubbing with a polishing tape the surface of the coating layer being treated (polishing), or by grinding with a grinding apparatus the surface of the coating layer being treated (grinding), or by both. When the magnetic layer-forming composition contains an abrasive, it is desirable to employ a polishing tape containing at least one type of abrasive with a higher Mohs hardness than the abrasive. A polishing tape in the form of a commercial product can be employed, or a polishing tape fabricated by a known method can be employed. A grinding apparatus in the form of a known grinding blade, grinding wheel, or the like, such as a fixed blade, diamond wheel, or rotary blade, can be employed. The surface of the coating layer that has been rubbed with a polishing tape or ground with a grinding apparatus can be wiped with a wiping material. Reference can be made to Japanese Unexamined Patent Publication (KOKAI) Heisei No. 6-52544, paragraphs 0034 to 0048, FIG. 1, and Examples given in this publication, for details regarding desirable polishing tapes, grinding apparatus, burnishing treatments, and wiping treatments. The content of the above publication is expressly incorporated herein by reference in its entirety. The more intense the burnishing treatment adopted, the lower the value of the logarithmic decrement tends to be. The higher the degree of hardness of the abrasive contained in the polishing tape, the more the burnishing treatment can be intensified. The greater the quantity of abrasive in the polishing tape, the more the burnishing treatment can be intensified. And the higher the degree of hardness of the grinding apparatus that is employed, the more the burnishing treatment can be intensified. The greater the rate of sliding of the surface of the coating layer being treated against the member (such as a polishing tape or grinding apparatus), the more the burnishing treatment can be intensified. This sliding rate can be increased by increasing either the speed with which the member is displaced or the speed with which the magnetic tape being treated is displaced, or both.

Following the above burnishing treatment (burnishing step), the coating layer (magnetic coating layer) of the magnetic layer-forming composition and the coating layer (nonmagnetic coating layer) of the backcoat layer-forming composition are subjected to a curing treatment. In the embodiment shown in FIG. 4, following the burnishing treatment, the coating layer of the magnetic layer-forming composition is subjected to a surface smoothing treatment before the curing treatment. The surface smoothing treatment can be conducted as separate steps on the magnetic layer side and backcoat layer side, respectively, or can be conducted as a single step. The surface smoothing treatment is desirably conducted as a calender treatment. It is possible to subject both the magnetic layer side and the backcoat layer side to a surface smoothing treatment in a single step by means of a calender treatment. Reference can be made, for example, to Japanese Unexamined Patent Publication (KOKAI) No. 2010-231843, paragraph 0026, for details regarding the calender treatment. The stronger the calender treatment, the smoother the surface of the magnetic tape can be made, and the lower the value of the centerline average surface roughness Ra that is measured on the surface on the magnetic layer side of the magnetic tape can be made. The higher the surface temperature of the calender rolls (calender temperature) is made and/or the greater the calender pressure, the stronger the calender treatment can be made.

Subsequently, the coating layer (magnetic coating layer) of the magnetic layer-forming composition and the coating layer (nonmagnetic coating layer) of the backcoat layer-forming composition are subjected to a curing treatment (curing step) based on the type of curing agent contained in these coating layers. The curing treatment can be conducted by a treatment based on the type of the curing agent contained in the two coating layers, such as by irradiation with light. The curing treatment conditions are not specifically limited, and can be suitably set based on the formula of the composition used to form the coating layers, the type of curing agent, the thickness of the coating layers, and the like. For example, when a composition containing a thermosetting compound such as polyisocyanate has been employed as the curing agent to form the above magnetic coating layer and nonmagnetic coating layer, the curing treatment is desirably a heat treatment. The curing treatment of the coating layer (magnetic coating layer) of the magnetic layer-forming composition and the coating layer (nonmagnetic coating layer) of the backcoat layer-forming composition can be conducted in a single step or in separate steps. When incorporating a thermosetting compound as the curing agent in both of the coating layers, it is possible to cure the curing agent (thermosetting compound) contained in both coating layers by means of a heat treatment. When a curing agent is incorporated into a layer other than the magnetic layer and the backcoat layer, the curing reaction of that layer can be promoted by a curing treatment. Alternatively, a separate curing step can be provided. Following the curing step, another burnishing step can be conducted.

Based on the above, it is possible to obtain a magnetic tape sequentially having a nonmagnetic layer and a magnetic layer on one surface of a nonmagnetic support and having a backcoat layer on the other surface thereof, in which the centerline average surface roughness Ra measured on the surface of the magnetic layer side is less than or equal to 1.8 nm, in which the logarithmic decrement on the magnetic layer side is less than or equal to 0.050, and in which the logarithmic decrement on the backcoat layer side is less than or equal to 0.060.

However, the above manufacturing method is an example. It is possible to achieve a logarithmic decrement on the magnetic layer side and a logarithmic decrement on the backcoat layer side falling within the above ranges by any means capable of adjusting the logarithmic decrement. Such embodiments are also covered by the present invention.

The magnetic tape according to an aspect of the present invention that has been described above can be housed in a magnetic tape cartridge and can be used to record, store, and reproduce information in the form of magnetic signals. In the magnetic tape cartridge, the magnetic tape is generally housed in a wound state on a reel within the cartridge main body. The reel is disposed in rotatable fashion within the cartridge main body. Single reel-type magnetic tape cartridges equipped with a single reel in the cartridge main body and dual reel-type magnetic tape cartridges with two reels in the cartridge main body are widely employed as magnetic tape cartridges. When a single-reel magnetic tape cartridge is loaded into a magnetic recording and reproducing device (drive) to record and/or reproduce a magnetic signal on the magnetic tape, the magnetic tape is drawn out of the magnetic tape cartridge and taken up on a reel on the drive side. A magnetic head is disposed on the tape conveyance route from the magnetic tape cartridge to the take-up reel. Magnetic tape feeding and winding take place between the reel (feed reel) on the magnetic tape cartridge side and the reel (tape-up reel) on the drive side. In this space, the magnetic head and the surface of the magnetic layer of the magnetic tape come into contact (slide against each other) to conduct magnetic signal recording and reproduction. By contrast, in a dual-reel magnetic tape cartridge, the two reels of the feed reel and the take-up reel are provided within the magnetic tape cartridge. The magnetic tape according to an aspect of the present invention can be housed either in the single-reel type or dual-reel type magnetic tape cartridge. The configuration of the magnetic tape cartridge is known.

An archive magnetic tape is stored for an extended period wound up on a reel within a magnetic tape cartridge once a magnetic signal has been recorded. The above magnetic tape according to an aspect of the present invention can afford good electromagnetic characteristics due to the good surface smoothness of the surface on the magnetic layer side, and can inhibit a drop in reproduction output with repeated running following long-term storage.

EXAMPLES

The present invention will be described in greater detail below through Examples. However, the present invention is not limited to the embodiments shown in Examples. The "parts" and "percent (%)" indicated below denote "weight parts" and "weight percent (%)".

Examples 1 to 11, Comparative Examples 1 to 13

1. Preparation of Alumina Dispersion

To 100.0 parts of alumina powder (HIT-80 made by Sumitomo Chemical Co., Ltd.) with an alpha conversion rate of 65% and a BET specific surface area of 20 m²/g were admixed 3.0 parts of 2,3-dihydroxynaphthalene (made by Tokyo Chemical Co., Ltd.), and 31.3 parts of a 32% solution (solvent: mixed solvent of methyl ethyl ketone and toluene) of polyester polyurethane resin having a polar group in the form of SO₃Na (UR-4800 made by Toyobo (Japanese registered trademark) (quantity of polar groups: 80 meq/kg)), and 570.0 parts of a 1:1 (weight ratio) mixed solution of methyl ethyl ketone and cyclohexanone as solvent. The mixture was dispersed for 5 hours in a paint shaker in the presence of zirconia beads. Following dispersion, the dispersion liquid and the beads were separated with a mesh to obtain an alumina dispersion.

2. Formula of Magnetic Layer-Forming Composition (Magnetic liquid)

| | |
|---|---|
| Ferromagnetic powder: see Table 1 | 100.0 parts |
| SO₃Na group-containing polyurethane resin (weight average molecular weight: 70,000, SO₃Na groups: 0.2 meq/g) | 14.0 parts |
| Cyclohexanone | 150.0 parts |
| Methyl ethyl ketone | 150.0 parts |

(Abrasive liquid)

| | |
|---|---|
| Alumina dispersion prepared in 1. above | 6.0 parts |

(Silica sol)

| | |
|---|---|
| Colloidal silica (silica colloid particles corresponding to the above definition) Average particle size: see Table 1 | 2.0 parts |
| Methyl ethyl ketone | 1.4 parts |

(Other components)

| | |
|---|---|
| Stearic acid | 2.0 parts |
| Amide stearate | 0.2 parts |
| Butyl stearate | 2.0 parts |
| Polyisocyanate (Coronate (Japanese registered trademark) L made by Nippon Industry Co., Ltd.) | 2.5 parts |

(Solvents added to finish)

| | |
|---|---|
| Cyclohexanone | 200.0 parts |
| Methyl ethyl ketone | 200.0 parts |

In Table 1, BF denotes ferromagnetic hexagonal barium ferrite powder with an average particle size (average plate diameter) of 21 nm and MP denotes ferromagnetic metal powder with an average particle size (average major axis length) of 30 nm.

3. Formula of Nonmagnetic Layer-Forming Composition

| | |
|---|---|
| Nonmagnetic inorganic powder: α-iron oxide | 100.0 parts |
| Average particle size (average major axis length): 0.15 μm | |
| Average acicular ratio: 7 | |
| BET specific surface area: 52 m²/g | |
| Carbon black | 20.0 parts |
| Average particle size: 20 nm | |
| Vinyl chloride copolymer | 13.0 parts |
| SO₃Na group-containing polyurethane resin | 9.0 parts |
| (weight average molecular weight: 70,000, SO₃Na groups: 0.2 meq/g) | |
| Phenylphosphonic acid | 3.0 parts |
| Stearic acid | 2.0 parts |
| Amide stearate | 0.2 parts |
| Butyl stearate | 2.0 parts |
| Cyclohexanone | 300.0 parts |
| Methyl ethyl ketone | 300.0 parts |

4. Formula of Backcoat Layer-Forming Composition

| | |
|---|---|
| Nonmagnetic inorganic powder: α-iron oxide | 80.0 parts |
| Average particle size (average major axis length): 0.15 μm | |
| Average aciciuar ratio: 7 | |
| BET specific surface area: 52 m²/g | |
| Carbon black | 20.0 parts |
| Average particle size: 20 nm | |
| Vinyl chloride copolymer | 13.0 parts |
| SO₃Na group-containing polyurethane resin | 6.0 parts |
| Phenylphosphonic acid | 3.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 355.0 parts |

5. Preparation of Various Layer-Forming Compositions

A magnetic layer-forming composition was prepared by the following method. The above magnetic liquid was prepared by dispersing (bead dispersing) for 24 hours the various components in a batch-type vertical sand mill. Zirconia beads with a bead diameter of 0.1 mmΦ were employed as dispersion beads. The magnetic liquid that had been prepared, the above abrasive liquid, and the other components (silica sol, other components and solvents added to finish) were mixed and bead dispersed for 5 minutes in the above sand mill, and then processed for 0.5 minute (ultrasonically dispersed) in a batch-type ultrasonic device (20 kHz, 300 W). Subsequently, filtration was conducted with a filter having an average pore diameter of 0.5 μm to prepare a magnetic layer-forming composition.

A nonmagnetic layer-forming composition was prepared by the following method. The various components excluding the lubricants (stearic acid, amide stearate, and butyl stearate), cyclohexanone, and methyl ethyl ketone were dispersed for 24 hours in a batch-type vertical sand mill to obtain a dispersion. Zirconia beads with a bead diameter of 0.1 mmΦ were employed as dispersion beads. Subsequently, the remaining components were added to the dispersion that had been obtained and the mixture was stirred in a dissolver. The dispersion thus obtained was filtered with a filter having an average pore diameter of 0.5 μm to prepare a nonmagnetic layer-forming composition.

A backcoat layer-forming composition was prepared by the following method. The various components excluding the lubricants (stearic acid and butyl stearate), polyisocyanate, and cyclohexanone were kneaded and diluted in an open kneader. The mixture was then subjected to 12 passes of dispersion processing in a horizontal bead mill disperser, each pass containing a retention time of 2 minutes, employing zirconia beads with a bead diameter of 1 mmΦ at a bead fill rate of 80 volume % and a rotor tip peripheral speed of 10 m/sec. Subsequently, the remaining components were added to the dispersion that had been obtained and the mixture was stirred in a dissolver. The dispersion thus obtained was filtered with a filter having an average pore diameter of 1 μm to prepare a backcoat layer-forming composition.

6. Fabrication of Magnetic Tapes

Magnetic tapes were fabricated based on the specific embodiment shown in FIG. 4. The details were as follows.

A polyethylene naphthalate support 4.50 pin in thickness was fed from a feed part. The nonmagnetic layer-forming composition prepared in 5. above was coated on one surface thereof in a quantity calculated to yield a dry thickness of 0.40 μm in a first coating part, and the coating was dried in a first heat treatment zone (atmospheric temperature: 100° C.) to form a coating layer.

Subsequently, the magnetic layer-forming composition prepared in 5. above was coated over the nonmagnetic layer in a quantity calculated to yield a dry thickness of 60 nm in a second coating part, forming a coating layer (magnetic coating layer). While the magnetic coating layer was still wet, it was passed through a cooling zone that had been adjusted to an atmospheric temperature of 0° C. for the residence time indicated in Table 1 to conduct a cooling step. It was then perpendicularly orientation processed by applying in a vertical direction a magnetic field with a field strength of 0.3 T in an orientation zone, and dried in a second heat treatment zone (atmospheric temperature: 100° C.) with an atmospheric temperature of 100° C.

Subsequently, in the third coating part, the backcoat layer-forming composition that had been prepared in 5. above was coated in a quantity calculated to yield a dry thickness of 0.60 μm on the opposite surface of the above polyethylene naphthalate support from that on which the nonmagnetic layer and magnetic layer had been formed to form a coating layer (nonmagnetic coating layer). The nonmagnetic coating layer that had been formed was then dried in a third heat treatment zone (atmospheric temperature: 100° C.).

The magnetic tape thus obtained was slit to ½ inch (0.0127 meter) width. The surface of the coating layer (magnetic coating layer) of the magnetic layer-forming composition was subjected to a burnishing treatment and a wiping treatment. In the burnishing treatment and the wiping treatment, a polishing tape in the form of a commercial polishing tape (product name MA22000, made by FujiFilm, abrasive: diamond/$Cr_2O_3$/red iron oxide) was employed in a processing device configured as described in FIG. 1 of Japanese Unexamined Patent Publication (KOKAI) Heisei No. 6-52544. A grinding blade in the form of a commercial sapphire blade (width 5 mm, length 35 mm, tip angle 60 degrees, made by Kyocera Corp.) was employed. A wiping material in the form of a commercial wiping material (product name WRP736, made by Kuraray Co.) was employed. The processing conditions of Example 12 in Japanese Unexamined Patent Publication (KOKAI) Heisei No. 6-52544 were adopted.

Subsequently, the surface of the coating layer (nonmagnetic coating layer) of the backcoat layer-forming composition was subjected to a burnishing treatment and a wiping treatment by the same method as in the processing of the magnetic coating layer set forth above.

Following the above burnishing and wiping treatments, a calender treatment (surface smoothing treatment) was conducted at the calender temperature (temperature of the surface of the calender rolls) indicated in Table 1 at a linear pressure of 300 kg/cm and a speed of 80 m/min with a calender comprised solely of metal rolls.

Subsequently, a curing treatment (heat treatment) was conducted for 36 hours in an environment with an atmospheric temperature of 70° C. to obtain a magnetic tape.

In the comparative examples in which "Not implemented" is recorded in the column of "Cooling zone residence time" in Table 1, the magnetic tape was fabricated by a manufacturing process that did not include a cooling zone.

In the comparative examples in which "Not implemented" is recorded in the column of "Burnishing treatment before curing step" in Table 1, the magnetic tape was fabricated by a manufacturing process in which the burnishing treatment and subsequent wiping treatment were not conducted in the steps prior to implementing the curing treatment.

In the comparative examples in which "Implemented" is recorded in the column of "Burnishing treatment after curing step" in Table 1, the burnishing treatment and wiping treatment set forth above were implemented in the steps following implementation of the curing treatment. In Comparative Example 7, the burnishing treatment and wiping treatment set forth above were repeated ten successive times on the surface on the magnetic layer side following the curing treatment.

The magnetic tapes of Examples and Comparative Examples were fabricated by the above processes.

1. Measurement of Centerline Average Surface Roughness Ra

A measurement area within a range of 40 μm×40 μm was measured on the surface on the magnetic layer side of the magnetic tapes of Examples and Comparative Examples with an atomic force microscope (Nanoscope 4 made by Veeco) and the centerline average surface roughness Ra was determined. A scan rate (probe displacement rate) of 40 μm/sec. and a resolution of 512 pixels×512 pixels were employed.

2. Measurement of Logarithmic Decrement

An RPT-3000W rigid-body pendulum-type physical property-testing instrument made by A&D Co., Ltd. (pendulum: made of brass; substrate: glass substrate; rate of substrate temperature increase: 5° C./min) was employed as the measurement device to determine the logarithmic decrements of the surfaces on the magnetic layer sides and the backcoat layer sides of the magnetic tapes of Examples and Comparative Examples by the method set forth above. For each of Examples and Comparative Examples, two samples for measurement were prepared, one of which was employed for the measurement of the logarithmic decrement of the surface on the magnetic layer side, and the other of which was employed for the measurement of the logarithmic decrement of the surface on the backcoat layer side. A sample for the measurement that was cut out of the magnetic tape of each of Examples or Comparative Examples was placed on a glass substrate about 3 cm×about 5 cm in size and secured in four spots with immobilizing tape (Kapton tape, made by Du Pont-Toray Co., Ltd.) as shown in FIG. 1. An attraction time of 1 second and a measurement interval of 7 to 10 seconds were employed, and a displacement-time curve was plotted for the 86th measurement interval. This curve was used to determine the logarithmic decrement. Measurements were conducted in an environment with a relative humidity of about 50%.

3. Measurement of the Electromagnetic Characteristics (Signal-to-Noise Ratio (SNR)) and the Amount of Drop in Reproduction Output with Repeated Running Following Acceleration Testing Equivalent to Long-Term Storage In each of Examples and Comparative Examples, two sample tapes were prepared for use in measuring the electromagnetic characteristics and the amount of drop in reproduction output with repeated running following acceleration testing equivalent to long-term storage. One of the sample tapes was used to measure the electromagnetic characteristics without implementing acceleration testing equivalent to long-term storage. The other sample tape was used to measure the amount of the drop in reproduction output with repeated running following acceleration testing equivalent to long-term storage. In the acceleration testing equivalent to long-term storage, a sample tape 1,000 m in overall length was wound on a reel and stored for 5 days in an environment with a temperature of 40° C. and a relative humidity of 80%. The acceleration testing was equivalent to storage for 10 years or more in an environment at room temperature (about 20° C. to 25° C.).

(1) Measurement of the Electromagnetic Characteristics

The electromagnetic characteristics (SNR) was measured by the following method using a ½ inch (0.0127 meter) reel tester on which a head had been secured. A head/tape relative speed of 5.5 m/sec. was employed. A metal-in-gap (MIG) head (gap length: 0.15 µm, track width: 1.0 µm) was employed. The recording current was set to the optimal recording current of each sample tape (magnetic tape). A giant magnetoresistive (GMR) head with an element thickness of 15 nm, a shield gap of 0.1 µm, and a read width of 0.5 µm was employed as the reproduction head. A signal with a linear recording density of 300 KFci was recorded. The reproduction signal was measured with a spectrum analyzer made by Shibasoku. The portion of the signal that had adequately stabilized once running had started was employed. Under the above conditions, recording and reproduction were conducted by making 500 sliding passes of 1,000 m per pass. The ratio of the output level of the carrier signal to the integrated noise of the entire spectral bandwidth was adopted as the SNR. For those examples and comparative examples in which ferromagnetic hexagonal barium ferrite powder (BF) was employed as the ferromagnetic powder, Comparative Example 2 was adopted, and for those examples and comparative examples in which ferromagnetic metal powder (MP) was employed, Comparative Example 3 was adopted as a reference (0 dB). BB-SNR (Broadband-SNR) is given in Table 1 as the value relative to these references.

In the magnetic tapes of Comparative Example 7, due to substantial scratching of the surface on the magnetic layer side of the magnetic tape, the head become clogged on the first pass. Since no reproduction signal could be obtained, evaluation was halted.

(2) Measurement of the Amount of Drop in Reproduction Output with Repeated Running Following Acceleration Testing Equivalent to Long-Term Storage Following the above acceleration testing equivalent to long-term storage, the sample tape was subjected to the same recording and reproduction as in (1) above. The output level of the carrier signal on the first pass and the output level of the carrier signal on pass 500 were determined. The difference ((output level on pass 1)−(output level on pass 500)) is given in Table 1 as the amount of drop in reproduction output with repeated running following acceleration testing equivalent to long-term storage.

In the magnetic tapes of Comparative Example 7, due to substantial scratching of the surface of the magnetic tape on the magnetic layer side, the head become clogged on the first pass. Since no reproduction signal could be obtained, evaluation was halted.

4. Evaluation of the Amount of Material Adhering to the Head with Repeated Running Following Acceleration Testing Equivalent to Long-Term Storage Following the measurement of 3.(2) above, the surface of the reproduction head after 500 passes back and forth was observed by differential interference microscopy and the amount of material adhering to the head was determined based on the following scale based on the breadth of the area over which adhesion of adhering material was determined in a microscopic image obtained by observation by differential interference microscopy.

5 points: Almost no material adhering to head
4 points: Slight amount of material adhering to head observed
3 points: Material adhering to head observed
2 points: Considerable material adhering to head observed
1 point: Extremely large quantity of material adhering to head observed.

The results of the above are given in Table 1.

TABLE 1

|  | Ex. 1 | Ex. 2 | Ex. 3 | Ex. 4 | Ex. 5 |
|---|---|---|---|---|---|
| Magnetic layer/Ferromagnetic powder | BF | MP | BF | BF | BF |
| Magnetic layer/Average particle size of colloidal silic (nm) | 80 | 80 | 80 | 80 | 80 |
| Magntic layer-forming process/Cooling zone residence time | 1 sec. | 1 sec. | 5 sec. | 60 sec. | 120 sec. |
| Magnetic layer-forming process/Burnishing treatment before curing step | Implemented | Implemented | Implemented | Implemented | Implemented |
| Magntic layer-forming process/Burnishing treatment after curing step | Not implemented | Not implemented | Not implemented | Not implemented | Not implemented |
| Calender temp. (° C.) | 110 | 110 | 110 | 110 | 110 |
| Backcoat layer-forming process/Cooling zone residence time | 1 sec. | 1 sec. | 1 sec. | 1 sec. | 1 sec. |
| Backcoat layer-forming process/Burnishing treatment before curing step | Implemented | Implemented | Implemented | Implemented | Implemented |
| Backcoat layer-forming process/Burnishing treatment after curing step | Not implemented | Not implemented | Not implemented | Not implemented | Not implemented |
| Centerline average surface roughness Ra on the mag (nm) | 1.8 | 1.8 | 1.8 | 1.8 | 1.8 |
| Logarithmic decrement on the magnetic layer side | 0.048 | 0.048 | 0.042 | 0.034 | 0.021 |
| Logarithmic decrement on the backcoat layer side | 0.058 | 0.058 | 0.058 | 0.058 | 0.058 |
| BB-SNR (dB) | 1.5 | 1.5 | 1.5 | 1.5 | 1.5 |
| Amount of drop in the reproduction (dBm) output with repeated running following acceleration testing equivalent to long-term storage | −0.8 | −0.9 | −0.8 | −0.8 | −0.7 |
| Amount of material adhering to head after repeated running following acceleration testing equivalent to long-term storage (Few amount) 5 ↔ 1 (Much amount) | 5 | 5 | 5 | 5 | 5 |

|  | Ex. 6 | Ex. 7 | Ex. 8 | Ex. 9 | Ex. 10 | Ex. 11 |
|---|---|---|---|---|---|---|
| Magnetic layer/Ferromagnetic powder | BF | BF | BF | BF | BF | BF |
| Magnetic layer/Average particle size of colloidal silic (nm) | 80 | 80 | 80 | 80 | 40 | 40 |
| Magntic layer-forming process/Cooling zone residence time | 180 sec. | 1 sec. | 60 sec. | 180 sec. | 60 sec. | 60 sec. |
| Magnetic layer-forming process/Burnishing treatment before curing step | Implemented | Implemented | Implemented | Implemented | Implemented | Implemented |
| Magntic layer-forming process/Burnishing treatment after curing step | Not implemented | Not implemented | Not implemented | Not implemented | Not implemented | Not implemented |
| Calender temp. (° C.) | 110 | 110 | 110 | 110 | 90 | 110 |
| Backcoat layer-forming process/Cooling zone residence time | 1 sec. | 60 sec. | 60 sec. | 180 sec. | 60 sec. | 60 sec. |
| Backcoat layer-forming process/Burnishing treatment before curing step | Implemented | Implemented | Implemented | Implemented | Implemented | Implemented |

TABLE 1-continued

| | | | | | | |
|---|---|---|---|---|---|---|
| Backcoat layer-forming process/Burnishing treatment after curing step | Not implemented | Not implemented | Not implemented | Not implemented | Not implemented | Not implemented |
| Centerline average surface roughness Ra on the mag (nm) | 1.8 | 1.8 | 1.8 | 1.8 | 1.6 | 1.4 |
| Logarithmic decrement on the magnetic layer side | 0.015 | 0.048 | 0.034 | 0.015 | 0.034 | 0.034 |
| Logarithmic decrement on the backcoat layer side | 0.058 | 0.047 | 0.047 | 0.031 | 0.047 | 0.047 |
| BB-SNR (dB) | 1.5 | 1.5 | 1.5 | 1.5 | 2.5 | 3.0 |
| Amount of drop in the reproduction output with repeated running following acceleration testing equivalent to long-term storage (dBm) | −0.7 | −0.8 | −0.4 | −0.2 | −0.6 | −0.4 |
| Amount of material adhering to head after repeated running following acceleration testing equivalent to long-term storage   (Few amount) 5 ↔ 1 (Much amount) | 5 | 5 | 5 | 5 | 5 | 5 |

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Magnetic layer/Ferromagnetic powder | BF | BF | MP | BF | BF | BF |
| Magnetic layer/Average particle size of colloidal silic (nm) | 120 | 80 | 80 | 80 | 40 | 40 |
| Magnetic layer-forming process/Cooling zone residence time | Not implemented | Not implemented | Not implemented | Not implemented | Not implemented | Not implemented |
| Magnetic layer-forming process/Burnishing treatment before curing step | Not implemented | Implemented | Implemented | Implemented | Implemented | Implemented |
| Magnetic layer-forming process/Burnishing treatment after curing step | Implemented | Not implemented | Not implemented | Not implemented | Not implemented | Not implemented |
| Calender temp. (° C.) | 90 | 90 | 90 | 110 | 90 | 110 |
| Backcoat layer-forming process/Cooling zone residence time | Not implemented | Not implemented | Not implemented | Not implemented | Not implemented | Not implemented |
| Backcoat layer-forming process/Burnishing treatment before curing step | Not implemented | Not implemented | Not implemented | Not implemented | Not implemented | Not implemented |
| Backcoat layer-forming process/Burnishing treatment after curing step | Not implemented | Not implemented | Not implemented | Not implemented | Not implemented | Not implemented |
| Centerline average surface roughness Ra on the mag (nm) | 2.4 | 2.0 | 2.0 | 1.8 | 1.6 | 1.4 |
| Logarithmic decrement on the magnetic layer side | 0.062 | 0.061 | 0.061 | 0.063 | 0.064 | 0.064 |
| Logarithmic decrement on the backcoat layer side | 0.071 | 0.071 | 0.071 | 0.071 | 0.071 | 0.071 |
| BB-SNR (dB) | −2.5 | 0 | 0 | 1.4 | 2.4 | 4.0 |
| Amount of drop in the reproduction output with repeated running following acceleration testing equivalent to long-term storage (dBm) | −0.3 | −0.8 | −0.8 | −3.9 | −5.8 | −8.0 |
| Amount of material adhering to head after repeated running following acceleration testing equivalent to long-term storage   (Few amount) 5 ↔ 1 (Much amount) | 5 | 5 | 5 | 3 | 2 | 1 |

TABLE 1-continued

| | Comp. Ex. 7 | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|
| Magnetic layer/Ferromagnetic powder | BF | BF | BF | MP | BF | BF | MP |
| Magnetic layer/Average particle size of colloidal silic (nm) | 80 | 80 | 80 | 80 | 80 | 80 | 80 |
| Magntic layer-forming process/Cooling zone residence time | Not implemented | 1 sec. | 180 sec. | 1 sec. | Not implemented | Not implemented | Not implemented |
| Magntic layer-forming process/Burnishing treatment before curing step | Not implemented | Implemented | Implemented | Implemented | Not implemented | Not implemented | Not implemented |
| Magntic layer-forming process/Burnishing treatment after curing step | Implemented(105F) | Not implemented | Not implemented | Not implemented | Implemented | Implemented | Implemented |
| Calender temp. (° C.) | 110 | 110 | 110 | 110 | 110 | 110 | 110 |
| Backcoat layer-forming process/Cooling zone residence time | Not implemented | Not implemented | Not implemented | Not implemented | 1 sec. | 240 sec. | 1 sec. |
| Backcoat layer-forming process/Burnishing treatment before curing step | Not implemented | Implemented | Not implemented | Not implemented | Implemented | Implemented | Implemented |
| Backcoat layer-forming process/Burnishing treatment after curing step | Implemented | Not implemented | Not implemented | Not implemented | Not implemented | Not implemented | Not implemented |
| Centerline average surface roughness Ra on the mag (nm) | 1.8 | 1.8 | 1.8 | 1.8 | 1.8 | 1.8 | 1.8 |
| Logarithmic decrement on the magnetic layer side | 0.056 | 0.048 | 0.015 | 0.048 | 0.063 | 0.063 | 0.063 |
| Logarithmic decrement on the backcoat layer side | 0.071 | 0.071 | 0.071 | 0.071 | 0.058 | 0.015 | 0.058 |
| BB-SNR (dB) | Evaluation was impossible. | 1.5 | 1.5 | 1.5 | 1.5 | 1.5 | 1.5 |
| Amount of drop in the reproduction output with repeated running following acceleration testing equivalent to long-term storage (dBm) | Evaluation was impossible. | −3.7 | −3.6 | −4.2 | −3.7 | −3.7 | −3.9 |
| Amount of material adhering to head after repeated running following acceleration testing equivalent to long-term storage (Few amount) 5 ↔ 1 (Much amount) | 1 | 3 | 3 | 3 | 3 | 3 | 3 |

Based on the results given in Table 1, the magnetic tapes of Examples exhibited high SNRs and little drop in reproduction output with repeated running following acceleration testing equivalent to long-term storage corresponding to data storage by an archive recording medium.

An aspect of the present invention is useful in the technical field of magnetic tapes employed as archive recording media.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on a surface on one side of a nonmagnetic support and a backcoat layer comprising nonmagnetic powder and binder on a surface on the other side of the nonmagnetic support,
wherein the centerline average surface roughness Ra as measured on a surface on the magnetic layer side of the magnetic tape is less than or equal to 1.8 nm,
the logarithmic decrement as determined by a pendulum viscoelasticity test on the surface on the magnetic layer side of the magnetic tape is greater than or equal to 0.010 but less than or equal to 0.050,
the logarithmic decrement as determined by a pendulum viscoelasticity test on a surface on the backcoat layer side of the magnetic tape is greater than or equal to 0.010 but less than or equal to 0.060, and
the logarithmic decrement on the magnetic layer side and the logarithmic decrement on the backcoat layer side are determined by the following method:
securing a measurement sample of the magnetic tape with the measurement surface, which is either the surface on the magnetic layer side or on the backcoat layer side, facing upward on a substrate in a pendulum viscoelasticity tester;
disposing a columnar cylinder edge which is 4 mm in diameter and equipped with a pendulum 13 g in weight on the measurement surface of the measurement sample such that the long axis direction of the columnar cylinder edge runs parallel to the longitudinal direction of the measurement sample;
raising the surface temperature of the substrate on which the measurement sample has been positioned at a rate of less than or equal to 5° C./min up to 80° C.;
inducing initial oscillation of the pendulum;
monitoring the displacement of the pendulum while it is oscillating to obtain a displacement-time curve for a measurement interval of greater than or equal to 10 minutes; and
obtaining the logarithmic decrement Δ from the following equation:

$$\Delta = \frac{\ln\left(\frac{A_1}{A_2}\right) + \ln\left(\frac{A_2}{A_3}\right) + \cdots \ln\left(\frac{A_n}{A_{n+1}}\right)}{n}$$

wherein the interval from one minimum displacement to the next minimum displacement is adopted as one wave period; the number of waves contained in the displacement-time curve during one measurement interval is denoted by n, the difference between the minimum displacement and the maximum displacement of the $n^{th}$ wave is denoted by An, and the logarithmic decrement is calculated using the difference between the next minimum displacement and maximum displacement of the $n^{th}$ wave ($A_{n+1}$ in the above equation).

2. The magnetic tape according to claim 1,
wherein the centerline average surface roughness Ra is greater than or equal to 1.2 nm but less than or equal to 1.8 nm.

3. The magnetic tape according to claim 1,
which comprises a nonmagnetic layer comprising nonmagnetic powder and binder between the magnetic layer and the nonmagnetic support.

4. A method of manufacturing a magnetic tape,
wherein the magnetic tape is a magnetic tape which comprises a magnetic layer comprising ferromagnetic powder and binder on a surface on one side of a nonmagnetic support and a backcoat layer comprising nonmagnetic powder and binder on a surface on the other side of the nonmagnetic support,
wherein the centerline average surface roughness Ra as measured on a surface on the magnetic layer side of the magnetic tape is less than or equal to 1.8 nm,
the logarithmic decrement as determined by a pendulum viscoelasticity test on the surface on the magnetic layer side of the magnetic tape according to the method of claim 1 is greater than or equal to 0.010 but less than or equal to 0.050, and the logarithmic decrement as determined by a pendulum viscoelasticity test on a surface on the backcoat layer side of the magnetic tape according to the method of claim 1 is greater than or equal to 0.010 but less than or equal to 0.060, and
wherein the method of manufacturing the magnetic tape comprises forming a magnetic layer and forming a backcoat layer, wherein
the forming of a magnetic layer comprises:
coating a magnetic layer-forming composition comprising ferromagnetic powder, binder, a curing agent, and solvent on a nonmagnetic support, either directly or over another layer, to form a magnetic coating layer,
drying the magnetic coating layer by a heat treatment, and
curing the magnetic coating layer by subjecting the magnetic coating layer to a curing treatment, with cooling the magnetic coating layer after the coating but before the drying, and burnishing a surface of the magnetic coating layer after the drying but before the curing; and forming of a backcoat layer comprises:

coating a backcoat layer-forming composition comprising nonmagnetic powder, binder, a curing agent, and solvent on a surface of the nonmagnetic support to form a nonmagnetic coating layer, drying the nonmagnetic coating layer by a heat treatment, and curing the nonmagnetic coating layer by subjecting the nonmagnetic coating layer to a curing treatment, with cooling the nonmagnetic coating layer after the coating but before the drying, and burnishing a surface of the nonmagnetic coating layer after the drying but before the curing.

5. The method of manufacturing a magnetic tape according to claim 4, wherein the cooling in the forming of a magnetic layer is conducted by placing the magnetic coating layer in a cooling atmosphere ranging from −10° C. to 0° C.

6. The method of manufacturing a magnetic tape according to claim 4, wherein the solvent contained in the magnetic layer-forming composition comprises ketone solvent.

7. The method of manufacturing a magnetic tape according to claim 4, wherein the cooling in the forming of a backcoat layer is conducted by placing the nonmagnetic coating layer in a cooling atmosphere ranging from −10° C. to 0° C.

8. The method of manufacturing a magnetic tape according to claim 4, wherein the solvent contained in the backcoat layer-forming composition comprises ketone solvent.

9. The method of manufacturing a magnetic tape according to claim 4, wherein the curing agent contained in the magnetic layer-forming composition and the curing agent contained in the backcoat layer-forming composition are thermosetting compounds, and the curing in the forming of a magnetic layer and the curing in the forming of a backcoat layer are carried out by heat treatments.

10. The method of manufacturing a magnetic tape according to claim 9, wherein the thermosetting component is polyisocyanate.

* * * * *